United States Patent [19]

Dang

[11] Patent Number: 5,581,540

[45] Date of Patent: Dec. 3, 1996

[54] SINGLE DISK WRITE PROTECTION SYSTEM FOR MULTIPLE-DISK CARTRIDGE

[75] Inventor: Chi-Hung Dang, Tucson, Ariz.

[73] Assignee: International Business Machines Corporation, Armonk, N.Y.

[21] Appl. No.: 385,503

[22] Filed: Feb. 8, 1995

[51] Int. Cl.[6] ................................................ G11B 23/03
[52] U.S. Cl. .......................................... 369/291; 360/133
[58] Field of Search ................................... 369/289, 291, 369/34, 36, 37, 77.2, 178, 179, 191; 360/133, 135, 98.04, 98.06, 99.02, 99.06

[56] References Cited

U.S. PATENT DOCUMENTS

| | | | |
|---|---|---|---|
| 3,662,360 | 5/1972 | Lambert | 369/291 |
| 4,460,930 | 7/1984 | Takahashi | 310/60 |
| 4,536,812 | 8/1985 | Oishi et al. | 360/133 |
| 4,564,871 | 1/1986 | Cybulski | 360/60 |
| 4,617,655 | 10/1989 | Aldenhoven | 369/291 |
| 4,800,554 | 1/1989 | Yamasaki et al. | 369/291 |
| 4,819,114 | 4/1989 | Bernitt et al. | 360/133 |
| 4,908,817 | 3/1990 | Sandell et al. | 369/291 |
| 5,041,923 | 8/1991 | Iwata et al. | 360/60 |
| 5,159,585 | 10/1992 | Ikedo et al. | 369/36 |
| 5,231,552 | 7/1993 | Schneider et al. | 360/92 |
| 5,325,256 | 6/1994 | Miyazaki et al. | 360/132 |
| 5,371,644 | 12/1994 | Hoge et al. | 360/133 |

FOREIGN PATENT DOCUMENTS

| | | | |
|---|---|---|---|
| 355011 | 2/1990 | European Pat. Off. | 369/291 |
| 61-68767 | 4/1986 | Japan . | |
| 61-68186 | 7/1986 | Japan | 360/133 |
| 61-206981 | 9/1986 | Japan | 369/291 |
| 1-204250 | 8/1989 | Japan | 360/60 |

*Primary Examiner*—John H. Wolff
*Assistant Examiner*—David L. Ometz
*Attorney, Agent, or Firm*—Baker, Maxham, Jester & Meador

[57] ABSTRACT

A write protection system for machine-readable data storage disks, such as optical disks, of a single or multiple disk cartridge, where write protection of any disk can be individually enabled or disabled while the cartridge is inserted into a disk drive. Separate trays support each of the disks, all trays being housed by a cartridge. When the cartridge is inserted into the disk drive, only a face of the cartridge is exposed. Each tray includes a write protection mechanism positioned near the cartridge face when that tray is housed by the cartridge. Each mechanism provides a user-selectable, machine-readable indication of the protection status of its associated disk. An exemplary mechanism includes a resilient finger, deformably pivotable from a released position to an activated position when a deflection pin is pressed against the finger through an activation hole in the cartridge face. A detente is resiliently urged toward the finger, at an intersecting angle thereto. The detente includes a ramp with a catch facing the finger. As the finger moves from its released position to its activated position, the ramp slidably contacts the finger's tip. The catch maintains the finger in its activated position after the tip slides past the catch. Manually extending a deflecting pin against the detente through a releasing hole in the face pivots the detente away from the finger, causing the tip and the catch to move apart, whereupon the finger's resiliency snaps it back into its released position.

33 Claims, 6 Drawing Sheets

SINGLE DISK WRITE PROTECTION SYSTEM FOR MULTIPLE-DISK CARTRIDGE

BACKGROUND OF THE INVENTION

1. Field of the Invention

The present invention relates to write protection mechanisms for machine-readable data storage disks. More particularly, the invention concerns a write protection system for disks of a single or multiple disk cartridge, where write protection of any disk can be individually enabled or disabled while the disk and its cartridge are inserted into a disk drive.

2. Description of the Related Art

Many different schemes of "write protection" are used to prevent the writing of data to machine readable data storage disks. Certain floppy diskettes, for example, have flat, flexible jackets with one edge that defines a write protect notch. This type of diskette becomes a read-only diskette when a user covers the notch with an adhesive paper strip. As another example, many rigid diskettes have flat jackets with a two-position write-protect tab on one side. To activate this type of write protection device, a user slides the tab to a designated position.

In many applications, these conventional write protection schemes are satisfactory for their intended purposes. One advantage of these devices is that each diskette includes its own write-protect device. However, these devices are limited in certain other ways. For example, a user cannot access the write protection device of one of these diskettes while the diskette is inserted into a disk drive. The user therefore must remove the diskette from the drive to initiate write protection.

In addition to individual diskette protection, engineers have developed devices to write-protect multi-diskette cartridges. To operate a known cartridge-based write-protect device, a user activates a write protection device on the cartridge, thereby rendering the diskettes in the cartridge read-only. Unlike the individual diskettes described above, some conventional multi-diskette cartridges may be write-protected while inserted in a disk drive. With these cartridges, the write protection feature includes a selector that is positioned in the cartridge's face, which is exposed while the cartridge is inserted into a disk drive. Typically, the write protection is activated by pressing a button on the face of the cartridge. Despite this advantage, these cartridge systems are burdened with a different limitation than write protection devices designed for individual diskettes. Specifically, they do not permit users to individually write-protect diskettes contained in the cartridge. With the cartridge system, then, write protection is "all or none."

SUMMARY OF THE INVENTION

The present invention concerns a write protection system for disks of a single or multiple disk cartridge, where write protection of any disk can be individually enabled or disabled without extracting the disk or its cartridge from the disk drive. In a preferred embodiment of the invention, a write protection system is provided for machine readable optical data storage disks ("optical disks"). One embodiment of the invention comprises a write protection mechanism with an opaque flag that can be toggled between two positions. In one position, the flag blocks a light beam, indicating the associated disk's write protection status to circuitry of the optical disk drive.

The write protection mechanism includes a planar tray to support an optical disk while the disk is stored, or alternatively while the disk is conveyed for access by an optical disk drive of a computing system. The tray is shaped for slidable insertion into the disk drive. The write protection mechanism is positioned at the tray's outer edge, where it provides a user-selectable, machine-readable indication of the optical disk's protection status. The write protection mechanism is accessible through a face of the cartridge, wherein the face and the outer edge are adjacent to each other when the tray is housed within the cartridge. When the cartridge is inserted into the optical disk drive, the face is still exposed.

The write protect mechanism includes user-activated receiving members that change the disk's protection status in response to pressure applied by a user. Specifically, a first one of the receiving members comprises a resilient finger secured to the tray, and pivotably deformable in the plane of the tray from a released position to an activated position. The finger includes a base, an enlarged flag, and a tip. In an illustrative embodiment, the optical disk drive is configured to emit a beam of light downward through the write protect mechanism; when the finger is in the activated position and the cartridge is fully inserted into the optical disk drive, the flag blocks the light beam, causing electronic circuitry to recognize the protection status of the tray and its associated disk.

A second receiving member comprises a resilient detente secured to the tray in a position largely perpendicular to the finger. Like the finger, the detente is also movable in the tray's plane. The detente includes a ramp with a catch facing the finger. The connection between the detente and the tray urges the ramp toward the finger to slidably contact the tip while the finger moves from its released position to its activated position. When the tip slides past the catch, the catch latches the tip and maintains the finger at its activated position.

The cartridge face defines an activating hole aligned with the finger, and a releasing hole aligned with the detente. Each hole is sized to receive a deflection pin of a specified cross-sectional size and shape. When a user inserts a proper deflection pin into the activating hole, the pin contacts the flag and deformably pivots the finger into its activated position, where the finger is latched in place by the contact between the tip and the catch. When a user inserts a proper deflection pin into the releasing hole, the pin contacts the ramp and deformably pivots the detente away from the finger, thereby releasing the tip from the catch and causing the finger to spring back into its released position.

The invention affords its users with a number of distinct advantages. First, the invention provides a single or multi-disk cartridge with individual write protection for each disk. Moreover, the invention provides a write protection mechanism whose protection status can be changed even while the associated disks are inserted into a disk drive. The invention is also convenient to operate, because a user can activate and release the write protection mechanism using a simple paper clip.

BRIEF DESCRIPTION OF THE DRAWINGS

The nature, objects, and advantages of the invention will become more apparent to those skilled in the art after considering the following detailed description in connection with the accompanying drawings, in which like reference numerals designate like parts throughout, wherein.

DETAILED DESCRIPTION OF THE PREFERRED EMBODIMENTS

Structure

The present invention concerns a write protection system for disks of a single or multiple disk cartridge, where write protection of any diskette be individually enabled or disabled without extracting the disk or its cartridge from the host computer. The write protection system of the invention is preferably used in conjunction with optical disks.

Figure 1:
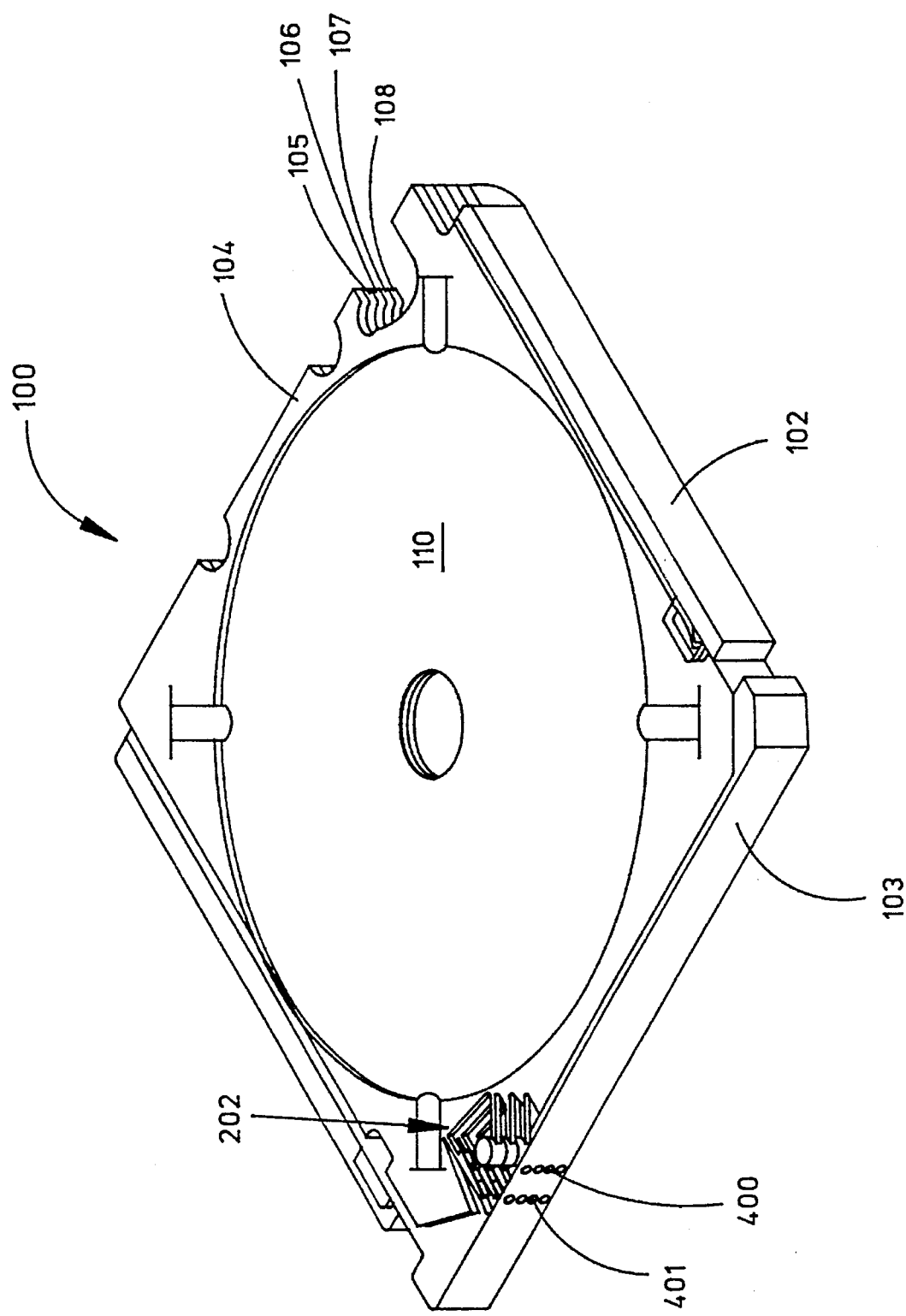
FIG. 1 is a cut-away perspective view of an optical disk cartridge 100 of the present invention with its cover removed.

As shown in FIG. 1, one aspect of the present invention includes an optical disk cartridge 100 for use with an optical disk drive (not shown) of a digital computing system. The cartridge 100 includes a cartridge shell 102, which houses multiple stacked trays 104–108. The shell 102 includes a face 103, which is exposed when the cartridge 100 is inserted into an optical disk drive. One optical disk may be deposited in each tray 104–108, as exemplified by the optical disk 110 shown resting in the tray 104. After a user slides the cartridge 100 into the optical disk drive, the drive selects one of the disks by removing the appropriate tray 104–108. Accordingly, the selected tray conveys the disk for use by the optical disk drive. The optical disk drive preferably includes a spindle (not shown) to support and rotate the selected disk, and circuitry (not shown) to read and write data to and from the selected disk.

Figure 2:
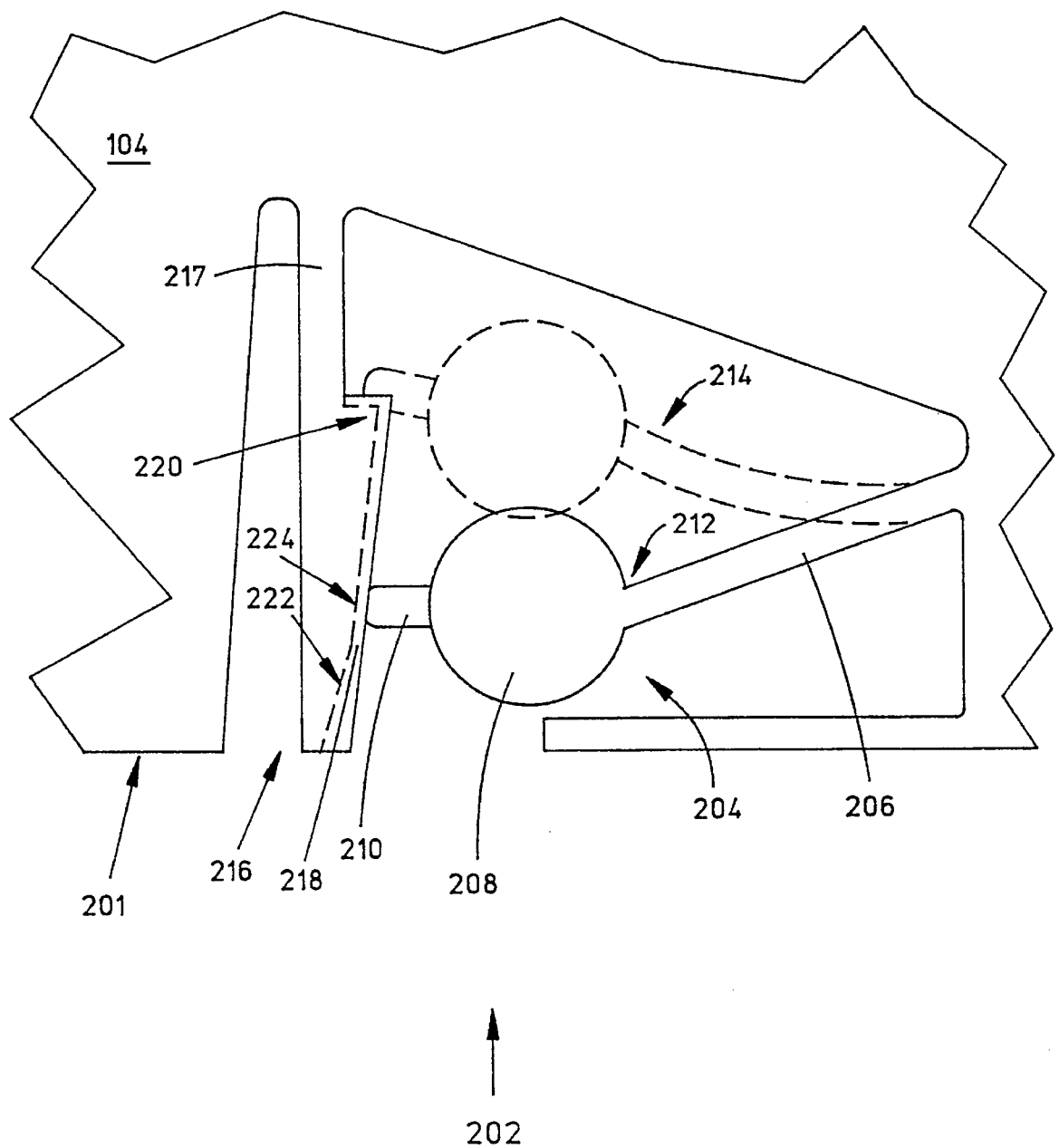
FIG. 2 is a partial top plan view of a tray 104 of the present invention.
Figure 3:
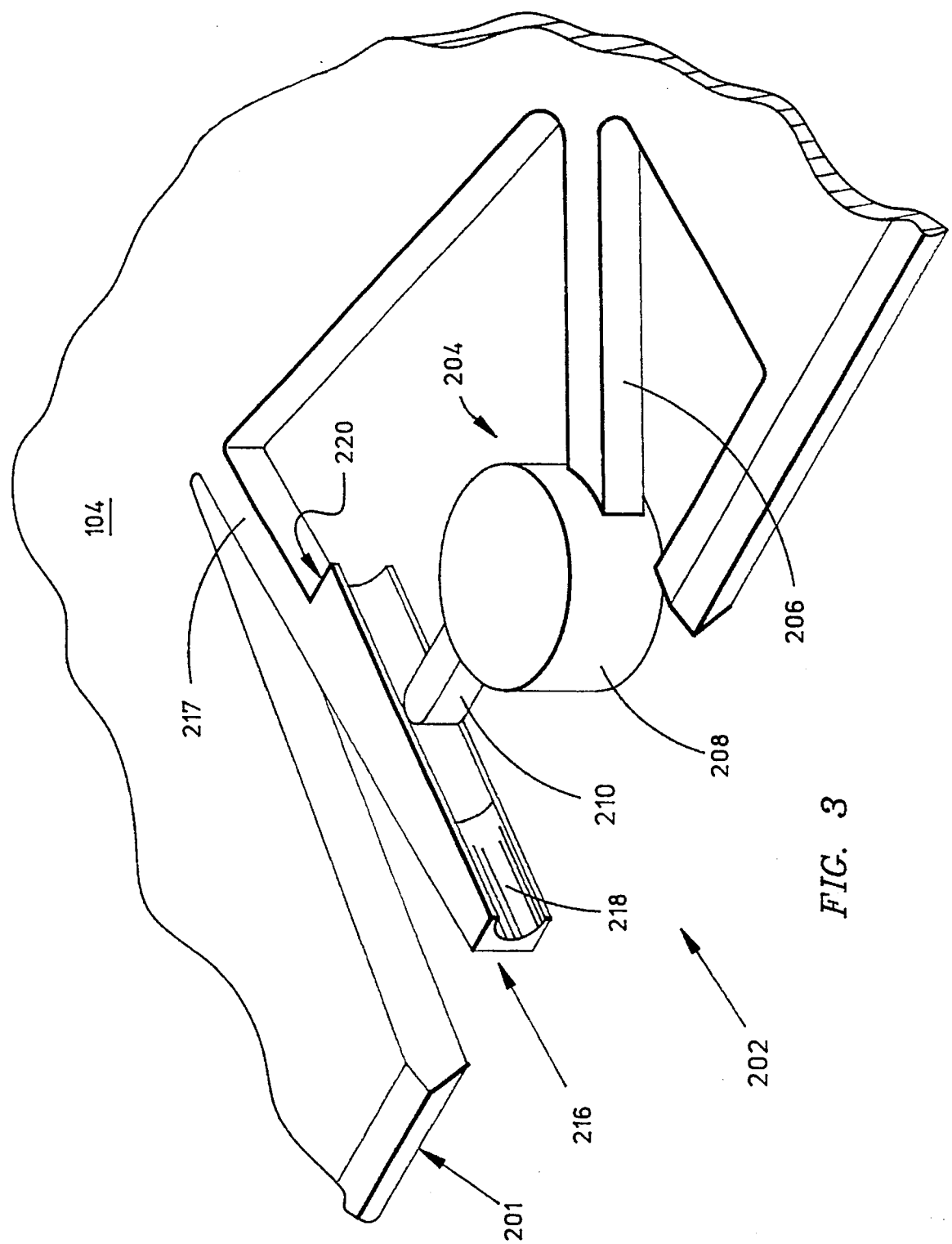
FIG. 3 is a partial perspective view of the tray 104 of the present invention.

FIGS. 2–3 illustrate the components of the tray 104 in greater detail. The tray 104 generally comprises a planar member with an outer edge 201. As described in greater detail below, the outer edge 201 resides proximate the cartridge's face 103 when the tray 104 is housed in the cartridge 100.

As discussed in greater detail below, the write protection mechanism provides a user-selectable, machine-readable indication of the optical disk's protection status. Primary components of the write protect mechanism are generally indicated by reference numeral 202. As discussed in greater detail below, the components of the write protect mechanism 202 are preferably integrally formed from the tray 104, proximate the outer edge 201. For example, the write protection mechanism 202 may be formed by removing or "cutting out" certain shapes of pieces from the tray 104. As a different example, the mechanism 204 may be created during vacuum molding or press molding the tray 104, where the mold includes features needed to form the components of the mechanism 202. Hence, the write protection mechanism 202 lies in the same plane as the tray 104. To provide a preferred level of deformable elasticity in the mechanism 202, for reasons discussed below, the tray 104 preferably comprises a resilient plastic such as a polycarbonate material, having a thickness of about 4 millimeters.

The mechanism 202 includes user-activated receiving members that change an associated disk's protection status in response to pressure applied by a user. Specifically, the mechanism 202 includes a resilient finger 204 and a resilient detente 216. The finger 204 comprises a base 206, an enlarged flag 208, and a tip 210. The base 206 is secured to the tray 104. Due to the resiliency of the finger 204, it is pivotably deformable in the plane of the tray 104 from a released position 212 to an activated position 214. The function of the finger 204 and its components are described in greater detail below.

The detente 216 includes a base 217 and a ramp 218, the base 217 being secured to the tray 104 to orient the ramp 218 at an intersecting angle to the finger 204. Preferably, the detente 216 is mounted largely perpendicular to the finger 204. The ramp 218 includes a catch 220 positioned at an inner end of the ramp 218. Additionally, the ramp 218 preferably includes a steep grade 222 and a shallow grade 224. However, the invention contemplates other embodiments of the ramp 218, such as a single grade ramp, curved grade, or another suitable configuration.

Like the finger 204, the resiliency of the detente 216 makes it deformably movable in the plane of the tray 104. Moreover, the connection between the detente 216 and the tray 104 urges the detente 216 toward the finger 204, so the ramp 218 slidably contacts the tip 210 during movement of the finger 204 from its released position 212 to its activated position 214. In this respect, the ramp 218 preferably defines a curved channel (shown in FIG. 3) and the tip 210 comprises a complementarily-sized rounded protrusion, so ramp 218 guides the tip 210 along the detente 216. The ramp 218 may, however, define an elongated guidance member of another appropriate shape. The catch 220 maintains the finger 204 at its activated position when the tip 210 slides past the catch 220.

Figure 4:
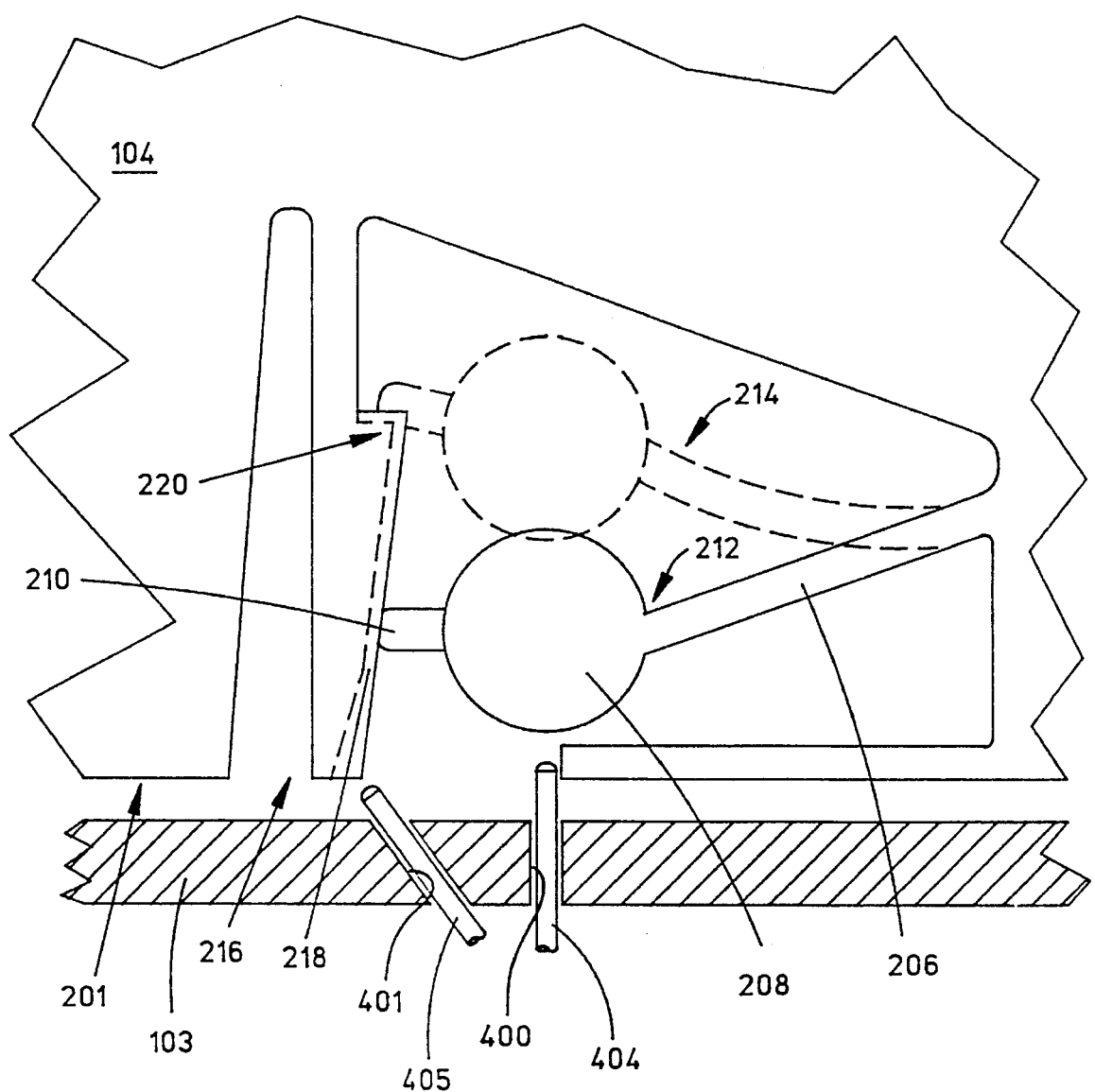
FIG. 4 is a top plan view of the tray 104 of the present invention with a partial cross-sectional view of the cartridge 100 of the invention.

Referring additionally to FIG. 4, the face 103 of the cartridge 100 preferably defines an activating hole 400 aligned with the finger 204, and a releasing hole 401 aligned with the detente 216. The holes 400–401 are sized to receive corresponding deflection pins 404–405, respectively, whose cross-sectional sizes and shapes complement the sizes and shapes of the holes 400–401. Although illustrative embodiments of the holes 400–401 have circular cross-sections, other shapes may be used. Likewise, the deflection pins 404–405 may be embodied in a variety of cross-sectional shapes. With appropriately sized holes 400–401, for example, one or both deflection pins 404–405 may comprise a straightened section of a paper clip.

FIG. 1 illustrates an implementation of the holes 400–401 in a multi-disk cartridge 100. When a multi-disk cartridge is used, each row of holes corresponds to a tray residing at the corresponding level within the cartridge 100. Thus, the write protection mechanism of any individual tray can be selectively activated or released by inserting a properly-sized deflecting pin through the appropriate hole corresponding to that tray.

Figure 5:
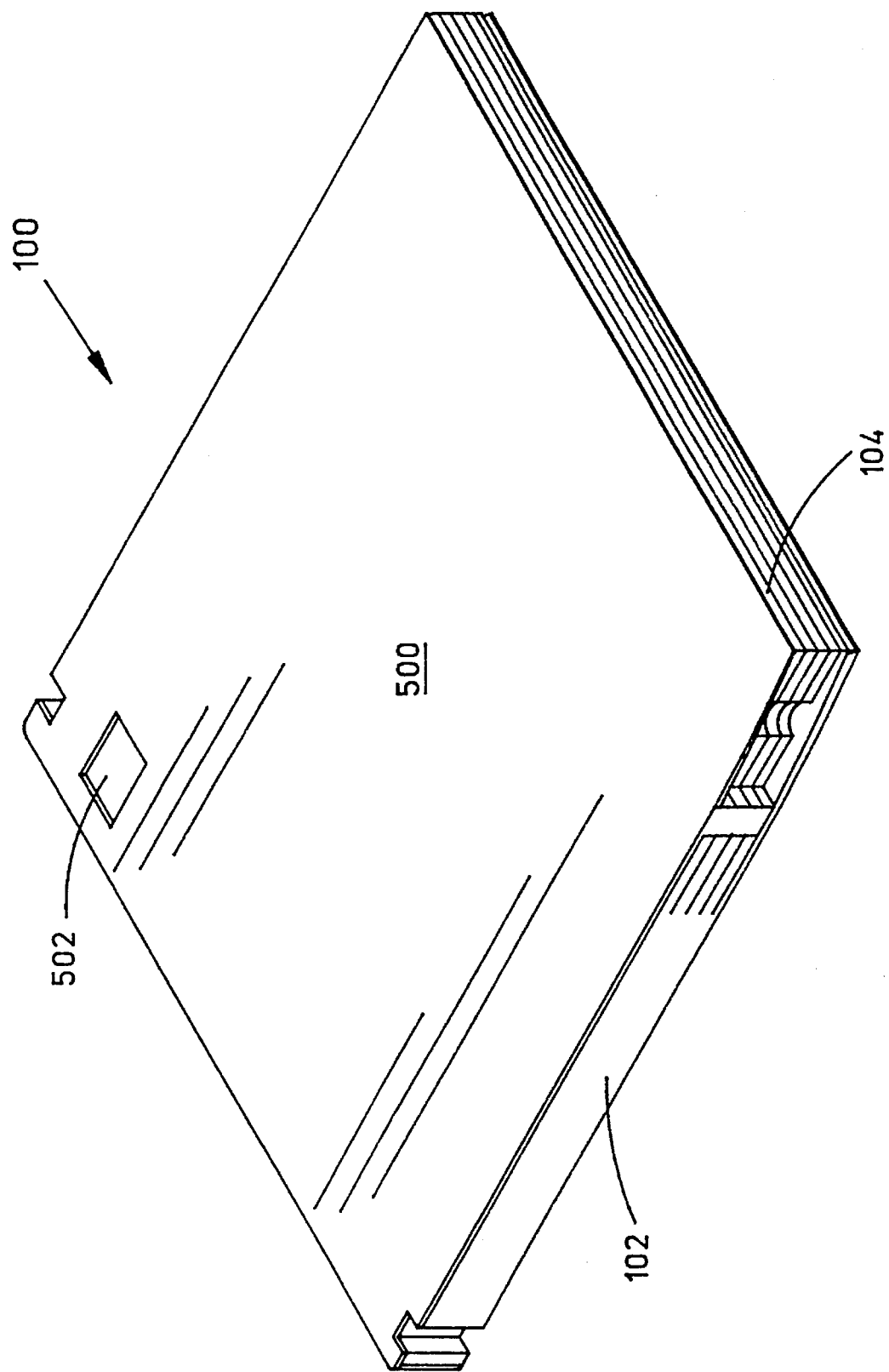
FIG. 5 is a perspective view of the cartridge 100 of the invention.

FIG. 5 illustrates the cartridge 100 completely enclosed by the cartridge shell 102, including a cover 500. The cover 500 may advantageously include a viewing window 502, aligned with the trays' write protection mechanisms (not shown). When the cartridge 100 is removed from the optical disk drive, the viewing window 502 provides a means for the user to visually examine the protection status of the trays contained in the cartridge 100.

Operation

Cartridge Use

To operate the cartridge of the present invention, a user removes one or more trays from the cartridge, and places optical disks on each of those trays. After providing the desired trays with disks, the trays are inserted back into the cartridge 100. Then, the user slides the cartridge 100 into the optical disk drive. When the cartridge 100 is inserted into the optical disk drive, most of the cartridge shell 102 is hidden from view, with only the face 103 being exposed.

The machinery of the optical disk drive then selects one of the trays 104–108 and extracts the selected tray from the cartridge 100. The disk residing on the selected tray is lifted, in position, by a spindle (not shown), which rotates the disk at a high rate of speed. Circuitry (not shown) of the optical disk drive then writes and reads data signals to and from the optical disk in accordance with instructions provided by the host computing system.

Activation and Release: Write-Protect and Write-Enable

The user may enable or disable write protection before or after inserting the cartridge 100 into the optical disk drive. In either case, this is accomplished by inserting the appropriate size of deflection pin into the activating hole 400 or the releasing hole 401, as desired. The "write protect" status may be designated by the released position 212 or the activated position 214, depending upon the circuitry of the optical disk drive, as discussed below. For purposes of an illustrative explanation, the released position 212 corresponds herein to a "write enable" status, with the activated position 214 corresponding to the "write protect" status.

With this configuration, a user who desires to write-protect a disk inserts a properly sized deflection pin 404 into the activating hole 400 corresponding to the proper tray. When the pin 404 contacts the flag 208, the pin 404 deformably pivots the finger 204 toward the activated position 214. During this transition, the tip 210 slides first along the steep grade 222, then along the shallow grade 224 as pressure between the finger and the detente 216 increases. When the pin 404 finally urges the finger 204 to the point where the tip 210 passes the catch 220, the detente 216 snaps toward the finger 204, locking the tip 210 against the catch 220. Here, the finger 204 is locked in its activated position 214, which corresponds to a "write-protect" indication.

In contrast, a user who desires to write-enable a disk must insert a properly sized deflection pin 405 into the releasing hole 401 corresponding to the appropriate tray. When the pin 405 contacts the detente 216, the pin 405 deformably pivots the detente 216 away from the finger 204. When the catch 220 extends beyond the tip 210, the resiliency of the finger 204 snaps it back into its released position 212. When the pin 405 is withdrawn from the hole 401, the resiliency of the detente 216 urges it back in the direction of the finger 204, where the ramp 218 once again contacts the tip 210.

Write Prevention Circuitry

Figure 6:
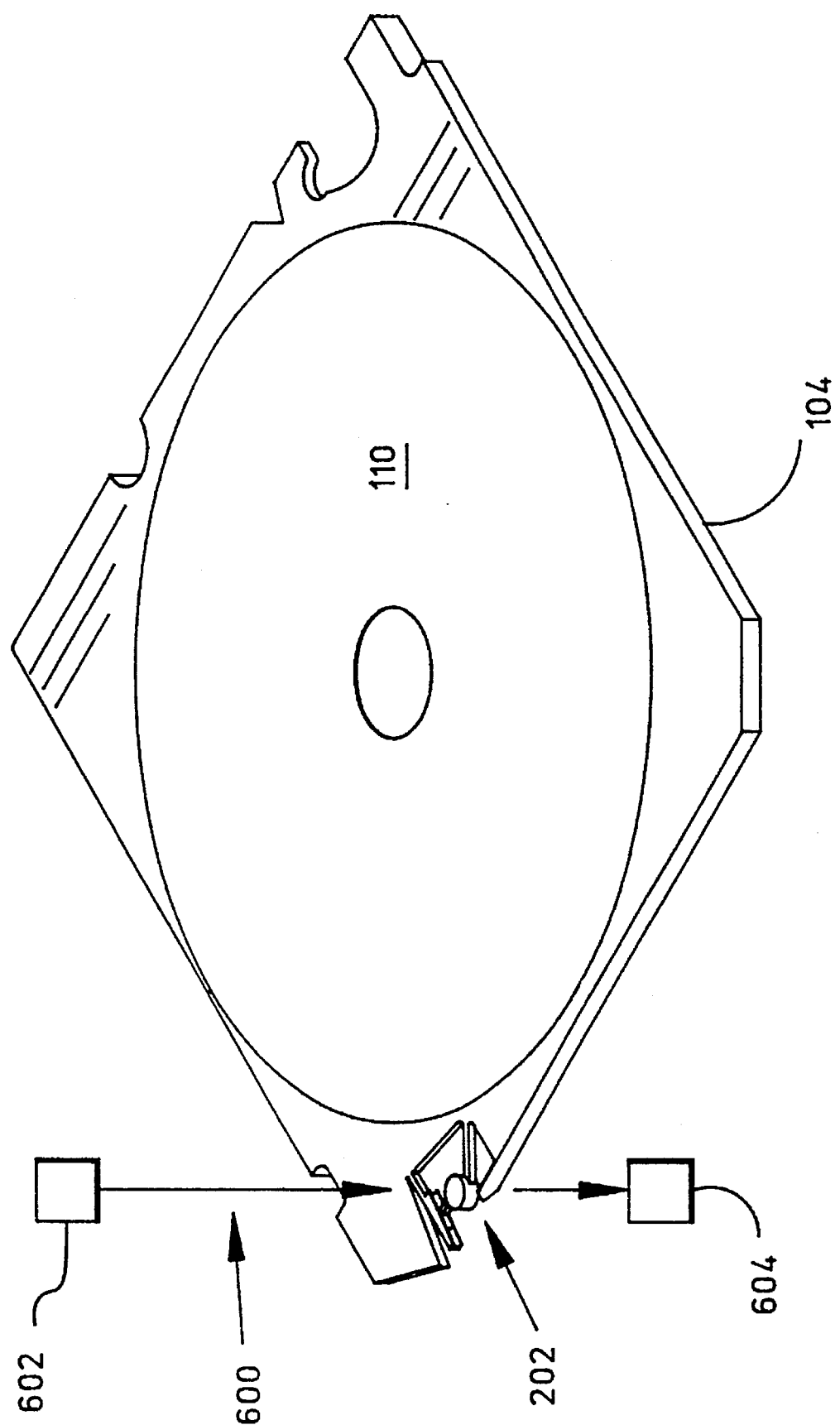
FIG. 6 is a perspective view of the tray 104, a disk 110, a write protect mechanism 202, and optoelectronic components of an optical disk drive, in accordance with the invention.

Referring to FIG. 6, the optical disk drive (not shown) preferably includes optoelectronic circuitry that is positioned appropriately to emit a beam of light 600 downward through a tray's write protect mechanism 202 after the optical drive extracts the tray from the cartridge 100. The circuitry of the optical disk drive determines the write protection status of the disk 110 according to whether the flag 208 blocks the light beam 600. For this reason, the flag 208 preferably comprises an opaque material.

The optoelectronic circuitry includes a light-emitting element 602 and a light-detecting element 604. In an illustrative embodiment, the light-emitting element 602 comprises a light emitting diode that produces a focused light beam with a small divergence angle. Other light-emitting elements may be substituted, such as laser diodes, incandescent light bulbs, or other suitable devices. The light-detecting element 604, in an exemplary embodiment, comprises a phototransistor sensitive to the wavelength of light produced by the light-emitting element 602. Other light-detecting elements, however, may be substituted, such as photodiodes or other suitable light-detecting devices.

In the illustrated embodiment, the elements 602 and 604 are positioned such that the flag 208 blocks the light beam 600 when the finger 204 is in the activated position 214. With this arrangement, blockage of the light beam 600 signifies that the disk 110 is designated as write protected. Alternatively, the elements 602 and 604 may be positioned to block the light beam 600 only when the finger 204 is in the released position 212. Here, unblocked passage of the light beam 600 signifies that the disk 110 is write protected. As another alternative, the user may designate the released position 212 of the FIG. 204 to represent the write-protect indication, corresponding to a blocked or unblocked light beam 600, as desired.

While there have been shown what are presently considered to be preferred embodiments of the invention, it will be apparent to those skilled in the art that various changes and modifications can be made herein without departing from the scope of the invention as defined by the appended claims.

What is claimed is:

1. A tray to support a machine-readable data storage disk for use by a disk drive of a computing system, wherein said tray is shaped to be housed within a cartridge that is shaped for slidable insertion into the disk drive, wherein said tray includes a write protection mechanism for selectively providing a machine-readable indication of a protection status of the disk, said mechanism including user-activated receiving members to change the indication in response to pressure manually applied by a user, said receiving members being positioned to be accessible when the cartridge is removed from the drive and also when the cartridge is inserted into the drive, said receiving members including a resilient finger attached to the tray and pivotably deformable between a first position and a second position in response to pressure applied to the finger, said receiving members also including a resilient detente attached to the tray, said detente including a catch to maintain the finger in place when the finger is moved into the second position, said detente being deformably releasable to release the finger back into the first position in response to pressure applied toward the detente in a predetermined direction.

2. A substantially planar tray to support a machine-readable data storage disk for use by a disk drive of a computing system, wherein said tray is shaped to be housed within a cartridge that is shaped for slidable insertion into the disk drive, the cartridge including a face that is exposed when the cartridge is fully inserted into the disk drive, said tray including an outer edge that is positioned proximate the face when the tray is housed by the cartridge, said tray including a write protection mechanism for selectively providing a machine-readable indication of a protection status of the disk, said mechanism including user-activated receiving members to change the indication in response to pressure manually applied by a user, said receiving members being positioned along the tray's outer edge and including a resilient finger attached to the tray and pivotably deformable in a plane parallel to the tray between a first position and a second position in response to pressure applied to the finger, said receiving members also including a resilient detente attached to the tray, said detente including a catch to maintain the finger in place when the finger is moved into the second position, said detente being deformably releasable to release the finger back into the first position in response to pressure applied toward the detente in a predetermined direction.

3. The tray of claim 2, wherein the resilient detente includes a ramp defining the catch such that the catch faces the finger, and said attachment between the detente and the tray urges the ramp toward the finger to slidably contact the finger during pivoting of the finger from the first position to the second position, said catch maintaining the finger at the second position after the finger slides past the catch, said detente being deformably pivotable to release the finger in response to pressure applied to the detente in the predetermined direction, the predetermined direction being in a direction away from the finger.

4. The tray of claim 2, wherein the finger comprises:
a resilient base secured to the tray;
a tip; and
a flag interposed between the tip and the base.

5. The tray of claim 4, wherein the detente comprises:
a resilient base secured to the tray;
said ramp affixed to the base and having defined therein a channel sized to receive the tip, said ramp including an outer end and an inner end; and
said catch, being provided proximate the ramp's inner end.

6. The tray of claim 4, wherein the flag comprises an opaque material.

7. The tray of claim 2, wherein the cartridge face conceals the write protection mechanism when the tray is housed within the cartridge, and the face has defined therein a hole to receive a deflection pin, and wherein said finger is movable from the first to the second position in response to sufficient extension of the deflection pin against the finger through the hole.

8. The tray of claim 7, wherein the finger includes a resilient base secured to the tray, a tip, and a flag interposed between the tip and the base, and the hole is aligned with the flag, and the finger is movable from the first to the second position in response to sufficient extension of the first deflection pin against the flag through the hole.

9. The tray of claim 7, further comprising the deflection pin.

10. The tray of claim 2, wherein the cartridge face conceals the write protection mechanism when the tray is housed within the cartridge, and the face has defined therein a hole aligned with the detente to receive a deflection pin, and wherein said detente is movable away from the finger to release the finger from the catch in response to sufficient extension of the deflection pin against the detente through the hole.

11. The tray of claim 10, further comprising the deflection pin.

12. The tray of claim 2, wherein the write protection mechanism comprises a plastic material.

13. The tray of claim 12, wherein the write protection mechanism comprises a polycarbonate material.

14. The tray of claim 2, wherein the write protection mechanism comprises an opaque material.

15. The tray of claim 2, further comprising the cartridge.

16. The tray of claim 15, wherein the cartridge includes a transparent window aligned with the write protection mechanism when the tray is housed within the cartridge.

17. The tray of claim 2, wherein the data storage disk supportable by the tray comprises an optical disk.

18. A cartridge for storing machine-readable data storage disks for use by at least one disk drive of a computing system, said cartridge including:
a cartridge shell for storing and conveying a predetermined number of trays, said shell including a face that is exposed when the cartridge shell is inserted into the disk drive; and
at least one tray, wherein each said tray is shaped to be housed by the cartridge shell and each said tray includes an outer edge that is positioned proximate the face when the tray is housed within the cartridge shell, each said tray also including a corresponding write protection mechanism for selectively providing a machine-readable indication of a protection status of a disk supported by said tray, each said mechanism including user-activated receiving members to change the corresponding tray's indication in response to pressure manually applied by a user, said receiving members being positioned along the corresponding tray's outer edge and comprising:
a resilient finger attached to the tray and pivotably deformable in a plane parallel to the tray between a first position and a second position in response to pressure applied to the finger: and
a resilient detente attached to the tray and including a catch to maintain the finger in place when the finger is moved into the second position, said detente being deformably releasable to release the finger back into the first position in response to pressure applied toward the detente in a predetermined direction;
wherein the cartridge shell houses the trays when the disks of the respective trays are not being accessed by said at least one disk drive.

19. The cartridge of claim 18, wherein the cartridge shell has defined therein, for each of the predetermined number of trays, activating and releasing holes aligned with the receiving members of that tray.

20. The cartridge of claim 18, wherein the data storage disks storable in the cartridge comprise optical disks.

21. The cartridge of claim 18, wherein the predetermined number of trays is one.

22. The cartridge of claim 18, further including said at least one disk drive, comprising:
a light-emitting element and a light-detecting element positioned within the drive to pass a light beam through a predetermined region of a selected one of said at least one trays, said selected tray having been extracted from the cartridge by the drive for accessing data on a disk supported by the selected tray; and
write protection circuitry to ascertain the protection status of the disk supported by the selected tray by determining whether the light beam is broken.

23. A substantially planar tray to support a machine-readable data storage disk for use by a disk drive of a computing system, wherein said tray is shaped to be housed within a cartridge that is shaped for slidable insertion into the disk drive, the cartridge including a face that is exposed when the cartridge is fully inserted into the disk drive, said tray including an outer edge that is positioned proximate the face when the tray is housed by the cartridge, said tray including a write protection mechanism for selectively providing a machine-readable indication of a protection status of the disk, said write protection mechanism including user-activated receiving members to change the indication in response to pressure manually applied by a user, said receiving members being positioned along the tray's outer edge and comprising:

a resilient finger attached to the tray and pivotably deformable in a plane parallel to the tray between a first position and a second position in response to pressure applied to the finger; and a resilient detente attached to the tray and including a ramp with an inboard catch facing the finger, wherein said attachment between the detente and the tray urges the ramp toward the finger to slidably contact the finger during pivoting of the finger from the first position to the second position, said catch maintaining the finger at the second position after the finger slides past the catch, said detente being deformably pivotable to release the finger in response to pressure applied to the detente in a direction away from the finger.

24. The tray of claim 23, wherein the finger comprises:

a resilient base secured to the tray;

a tip; and a flag interposed between the tip and the base.

25. The tray of claim 24, wherein the detente comprises:

a resilient base secured to the tray;

said ramp, being affixed to the base and having defined therein a channel sized to receive the tip, said ramp including an outer end and an inner end; and said catch, being provided proximate the ramp's inner end.

26. The tray of claim 23, wherein the cartridge face conceals the write protection mechanism when the tray is housed within the cartridge, and the face has defined therein a hole to receive a deflection pin, and wherein said finger is movable from the first to the second position in response to sufficient extension of the deflection pin against the finger through the hole.

27. The tray of claim 26, wherein the hole is aligned with the flag, and the finger is movable from the first to the second position in response to sufficient extension of the deflection pin against the flag through the hole.

28. The tray of claim 23, wherein the cartridge face conceals the write protection mechanism when the tray is housed within the cartridge, and the face has defined therein a hole aligned with the detente to receive a deflection pin, and wherein said detente is movable away from the finger to release the finger from the catch in response to sufficient extension of the deflection pin against the detente through the hole.

29. The tray of claim 26, further comprising the deflection pin.

30. The tray of claim 28, further comprising the deflection pin.

31. The tray of claim 24, wherein the flag comprises an opaque material.

32. A substantially planar tray to support a machine-readable data storage disk for use by a disk drive of a computing system, wherein said tray is shaped to be housed within a cartridge that is shaped for slidable insertion into the disk drive, the cartridge including a face that is exposed when the cartridge is fully inserted into the disk drive, said tray including an outer edge that is positioned proximate the face when the tray is housed by the cartridge, said tray including a write protection mechanism for selectively establishing a machine-readable indication of a protection status of the disk, said mechanism being accessible through the face via first and second holes defined in said face, said mechanism including first and second user-activated receiving members positioned along the tray's outer edge, said first user-activated receiving member being responsive to receipt of an implement via the first hole to change the indication from a write-unprotected state to a write-protected state, said second user-activated receiving member being responsive to receipt of an implement via the second hole to change the indication from the write-protected state to the write-unprotected state.

33. A method for establishing write protection status of a machine-readable data storage disk, comprising the steps of:

supporting the disk in a substantially planar tray having a write protection mechanism accessible via an outer edge of the tray for selectively establishing a machine-readable indication of a protection status of the disk, said write protection mechanism having mutually exclusive write-protected and write-unprotected states;

housing the tray within a cartridge such that the tray's outer edge is positioned proximate a face of the cartridge, and first and second holes defined in the face are positioned proximate the write protection mechanism;

slidably inserting the cartridge into a disk drive of a computing system such that the cartridge's face is exposed;

while the cartridge is inserted into the disk drive, inserting a narrow implement through the first hole sufficiently for contact with the write protection mechanism to change the indication from the write-unprotected state to the write-protected state; and while the cartridge is inserted into the disk drive, inserting a narrow implement through the second hole sufficiently for contact with the write protection mechanism to change the indication from the write-protected state to the write-unprotected state.

\* \* \* \* \*

UNITED STATES PATENT AND TRADEMARK OFFICE
CERTIFICATE OF CORRECTION

PATENT NO. : 5,581,540
DATED : December 3, 1996
INVENTOR(S) : Dang

It is certified that error appears in the above-indentified patent and that said Letters Patent is hereby corrected as shown below:

Column 8, line 24, change "finger:" to --finger;--

Signed and Sealed this

Eleventh Day of March, 1997

Attest:

BRUCE LEHMAN

Attesting Officer

Commissioner of Patents and Trademarks